(12) United States Patent
Artwohl et al.

(10) Patent No.: US 11,419,434 B1
(45) Date of Patent: Aug. 23, 2022

(54) DISPLAY CASE DOOR WITH DOOR HANDLE CAMERA

(71) Applicant: Anthony, Inc., Sylmar, CA (US)

(72) Inventors: Paul J. Artwohl, Stevensville, MI (US); Pedro Almaguer, North Hills, CA (US); Jeffery W. Nicholson, Palmdale, CA (US)

(73) Assignee: Anthony, Inc., Sylmar (CA)

( * ) Notice: Subject to any disclaimer, the term of this patent is extended or adjusted under 35 U.S.C. 154(b) by 69 days.

(21) Appl. No.: 16/591,001

(22) Filed: Oct. 2, 2019

Related U.S. Application Data (60) Provisional application No. 62/740,907, filed on Oct. 3, 2018.

(51) Int. Cl.
| | |
|---|---|
| *A47F 3/04* | (2006.01) |
| *A47F 3/00* | (2006.01) |
| *F25D 29/00* | (2006.01) |
| *F25D 27/00* | (2006.01) |
| *G06V 40/16* | (2022.01) |

(52) U.S. Cl.
CPC .............. *A47F 3/043* (2013.01); *A47F 3/001* (2013.01); *A47F 3/0434* (2013.01); *F25D 27/00* (2013.01); *F25D 29/005* (2013.01); *G06V 40/16* (2022.01); *F25D 2400/40* (2013.01); *F25D 2700/04* (2013.01)

(58) Field of Classification Search
CPC ........ A47F 3/001; A47F 3/043; A47F 3/0434; F25D 23/028; F25D 27/00; F25D 27/005; F25D 29/00; F25D 29/005; F25D 2400/40; F25D 2600/06; F25D 2700/04; G06K 9/00221; G06V 40/16
See application file for complete search history.

(56) References Cited

U.S. PATENT DOCUMENTS

| | | | |
|---|---|---|---|
| 8,683,745 B2 | 4/2014 | Artwohl et al. | |
| 9,052,536 B2 * | 6/2015 | Artwohl | ............ G09F 23/0058 |
| 9,687,087 B1 | 6/2017 | Artwohl et al. | |
| 9,710,992 B2 | 7/2017 | Borra | |
| 10,039,390 B2 | 8/2018 | Artwohl et al. | |
| 10,115,286 B2 * | 10/2018 | Kim | ..................... A61B 5/117 |
| 10,429,126 B2 | 10/2019 | Park | |
| RE48,115 E | 7/2020 | Artwohl et al. | |
| 10,769,666 B2 | 9/2020 | Avakian | |
| 2006/0238517 A1 | 10/2006 | King et al. | |
| 2010/0333006 A1 | 12/2010 | Ostergard et al. | |

(Continued)

FOREIGN PATENT DOCUMENTS

| | | | | |
|---|---|---|---|---|
| DE | 102009033087 A1 * | 2/2011 | ........... | F25D 23/028 |
| DE | 102013216759 A1 * | 2/2015 | ........... | F25D 29/005 |

(Continued)

*Primary Examiner* — Andrew M Roersma
(74) *Attorney, Agent, or Firm* — Fish & Richardson P.C.

(57) ABSTRACT

In one general aspect, the subject matter described in this specification can be embodied in a display case door that includes a transparent panel and a door handle coupled to the transparent panel. The handle includes a camera that is coupled to the handle. The camera is positioned such that a field of view of the camera is aimed away from the transparent panel. The handle includes an aperture opposite the camera lens. The aperture receives a power cable extending away from the camera to a power source.

26 Claims, 4 Drawing Sheets

(56) References Cited

U.S. PATENT DOCUMENTS

| | | | | |
|---|---|---|---|---|
| 2012/0127696 A1* | 5/2012 | Glovatsky | ............... | F25D 27/00 |
| | | | | 362/92 |
| 2015/0161871 A1* | 6/2015 | Kim | ..................... | A61B 5/7475 |
| | | | | 340/539.12 |
| 2016/0182868 A1* | 6/2016 | Izawa | ..................... | F25D 23/04 |
| | | | | 62/125 |
| 2016/0223250 A1* | 8/2016 | Kang | ............... | H04N 5/232411 |
| 2017/0234602 A1* | 8/2017 | Seo | ......................... | F25D 23/12 |
| | | | | 348/151 |
| 2018/0216830 A1* | 8/2018 | Ivanovic | ............... | F25D 29/005 |
| 2019/0121461 A1 | 4/2019 | Recio et al. | | |
| 2019/0122263 A1 | 4/2019 | Avakian | | |
| 2019/0383550 A1* | 12/2019 | Miedema | ............... | F25D 23/028 |
| 2021/0048935 A1 | 2/2021 | Lee et al. | | |

FOREIGN PATENT DOCUMENTS

| | | | | |
|---|---|---|---|---|
| EP | 3059535 A1 * | 8/2016 | ............. | G03B 29/00 |
| WO | WO-2016062441 A1 * | 4/2016 | ............. | F25D 17/04 |

* cited by examiner

DISPLAY CASE DOOR WITH DOOR HANDLE CAMERA

CROSS-REFERENCE TO RELATED APPLICATION

This application claims priority under 35 U.S.C. § 119 to U.S. Application Ser. No. 62/740,907, filed on Oct. 3, 2018, and entitled "Display Case Door with Door Handle Camera," the entire contents of which is incorporated by reference herein.

TECHNICAL FIELD

This invention generally relates to handles for commercial display case doors.

BACKGROUND

Refrigerated enclosures are used in commercial, institutional, and residential applications for storing and/or displaying refrigerated or frozen objects. Refrigerated enclosures may be maintained at temperatures above freezing (e.g., a refrigerator) or at temperatures below freezing (e.g., a freezer). Refrigerated enclosures have one or more thermally insulated doors or windows for viewing and accessing refrigerated or frozen objects within a temperature-controlled space. Doors for refrigerated enclosures generally include thermally insulated glass panel assemblies.

Displaying content on or nearby refrigerated display case doors can be an effective way of advertising products. Customizing the content of such advertisement for different customers can be challenging. Improvements in the methods for displaying customized content on or near refrigerated display case doors are sought.

SUMMARY

In a first general aspect, the subject matter described in this specification can be embodied in a display case door that includes a transparent panel and a door handle coupled to the transparent panel. The handle includes a camera coupled to the handle. The camera is positioned such that a field of view of the camera is aimed away from the transparent panel. The handle also includes an aperture opposite the camera lens and configured to receive a power cable extending away from the camera to a power source.

In some implementations, the display case door further includes a door frame extending about and secured to a peripheral edge of the panel.

In some implementations, the display case door includes one or more cameras coupled to the door frame, the one or more cameras positioned such that a field of view of the one or more cameras is aimed away from the transparent panel.

In some implementations, the door frame includes a channel configured to receive the power cable extending away from the aperture of the door handle.

In some implementations, the door handle includes two handle bases coupled to the door frame and a bar extending between the two handle bases. In some implementations, the camera is coupled to a top base of the two handle bases. In some implementations, at least one of the two handle bases includes a housing configured to receive the camera. In some implementations, the handle aperture includes a channel extending from an interface surface of a handle base to the housing and configured to receive the power cable. In some implementations, the housing includes a recess extending from a surface of the handle base opposite the transparent panel. In some implementations, the display case door further includes a cover configured to couple to walls of the housing to cover a portion of the camera, the cover including an aperture arranged to align with the field of view of the camera when the cover is coupled to the handle.

In some implementations, the camera is communicably coupled to a computing system configured to perform facial recognition.

In some implementations, the field of view of the camera includes a lens facing away from the transparent panel.

In some implementations, the display case door further includes an LED light coupled to a bar of the handle, the LED light facing away from the transparent panel. In some implementations, the handle bar includes a recess configured to receive the LED light, the handle bar including an inner channel extending from the recess to a handle base and configured to receive a cable from the LED light.

In another general aspect, the subject matter described in this specification can be embodied in a display case door that includes a transparent panel, a door frame extending about and secured to a peripheral edge of the panel, and a door handle coupled to the door frame. The handle includes a camera coupled to the handle. The camera is positioned such that a field of view of the camera is aimed away from the transparent panel. The handle includes an aperture opposite the camera lens configured to receive a power cable extending away from the camera into a channel of the door frame to a power source.

In another general aspect, the subject matter described in this specification can be embodied in a display case door that includes a transparent panel, a door frame extending about and secured to a peripheral edge of the panel, a power cable disposed within a channel in a portion of the door frame, and a door handle coupled to the door frame. The door handle includes two handle bases coupled to the door frame and a bar extending between the two handle bases. At least one of the two handle bases defines a housing. The door handle also includes a camera disposed within the hosing, the camera positioned such that a field of view of the camera is aimed away from the transparent panel. The door handle also includes an aperture opposite the camera lens and configured to receive the power cable, the power cable is configured to electrically connect the camera to a power source. The camera is communicably coupled to a computing system configured to perform facial recognition.

Implementations provide cameras in a display case door. Implementations may improve the maintainability of cameras and LED lights mounted on the handle. For example, implementations of the present disclosure may provide for easy installation and replacement or maintenance of cameras secured to the door handle without the need to remove the entire door, door frame, or handle. Implementations of the present disclosure may also allow a door handle with an embedded camera to be installed in an existing display case door without retrofitting the door. For example, a door handle with an embedded camera can be installed in a display case door that has a door frame including an internal channel where the power cable of the camera can be stored.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
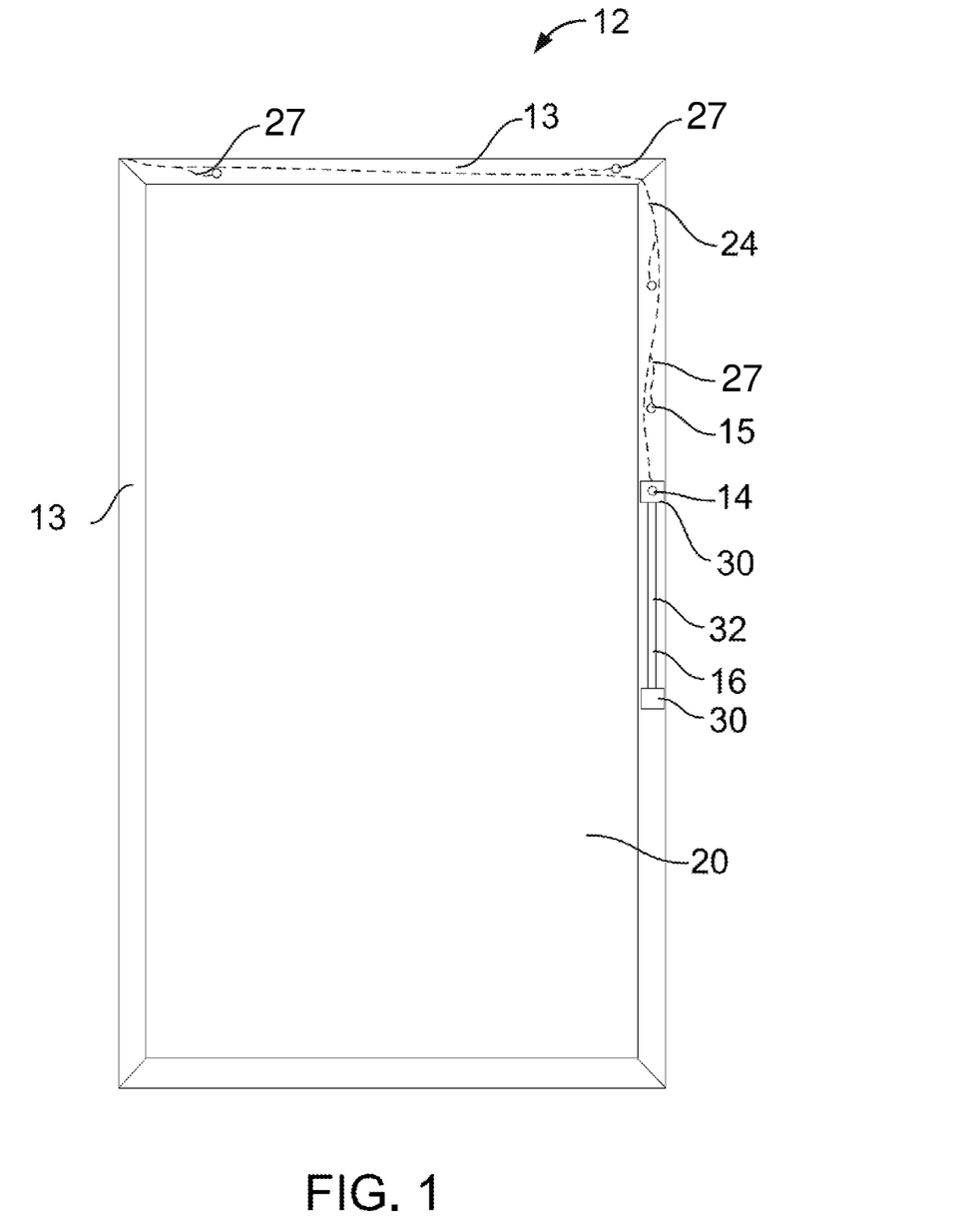
FIG. 1 is a front view of an exemplary display case door according to implementations of the present disclosure.

FIG. 1 illustrates an example implementation of a display case door 12. Display case door 12 includes a panel assembly 20 and a door handle 16. Door handle 16 includes a camera 14 coupled to the handle. Camera 14 can be attached to an outer surface of handle 16 or mounted inside a housing or cavity of the handle, as explained in detail below. Camera 14 is positioned such that a field of view of the camera (e.g., a lens of the camera) is aimed away from panel assembly 20. As described in more detail below with respect to FIG. 5, handle 16 includes an aperture (shown in FIG. 5) opposite the camera lens. In some implementations, a power cable 24, a data cable, or both can be passed through such aperture and be connected to the camera. Power cable 24 can be connected to and extend away from the camera to a power source (not shown).

Display case door 12 further includes a door frame 13 extending about and secured to a peripheral edge of the panel assembly 20. In some examples, door 12 includes one or more cameras 15 coupled to the door frame. Similar to camera 14, cameras 15 are positioned such that a field of view of the cameras is aimed away from the panel assembly. Door frame 13 includes an internal channel (e.g., as shown and described in reference to FIG. 5) configured to receive and cover power cables 24 and 27 that provide power to handle camera 14 and door frame cameras 15 respectively. Power cable 24 extends from a power source (not shown) that can be external to display case door 12. As further described in detail with respect to FIG. 2, power cable 24 can enter display case door through an aperture or door hinge to connect to the cameras.

As shown in FIG. 1, door handle 16 is attached to door frame 13. In some cases, display case door 12 can be a frameless door with handle 16 directly attached to panel assembly 20. For example, camera 14 can be battery powered and can be a wireless camera that communicates to and receives data from a computer or server (not shown) In some implementations, door handle 16 is a pull handle with two bases 30 attached to door frame 13 and a bar 32 extending between and coupled to the two bases 30. Handle 16 can be attached to panel assembly 20 by using mechanical fasteners or an adhesive or epoxy. Handle 16 may be used to open, close, lock, unlock, seal, unseal, or otherwise operate display case door 12. Handle 16 can be machined from extruded aluminum tubes that are cut to a specified dimension to form the handle bases 30 and handle bar 32, and coupled to form the handle that is secured to a front surface of display case door 12.

Handle camera 14 can be coupled to any of the bases 30 or to the handle bar 32. In the example implementation shown in FIG. 1, camera 14 is coupled to a top base 30a of handle 16. In some examples, camber 14 can be positioned with in the handle 16 such that its field of view is directed towards a customer's face when the customer is opening the display case door 12. Cameras 14 and 15 can be communicably coupled to an image processing system (not shown) configured to perform facial recognition. For example, a lens of the camera facing a person standing in front of door 12 can detect the face of the person and capture images of facial features of the person. The system can include instructions that when executed by one or more processors of the system, cause the system to perform facial recognition algorithms on the images captured by the camera. For example, the system can perform algorithms that analyze or authenticate using a database of facial images or using biometric artificial intelligence.

In some implementations, cameras 14 and 15, together with a display screen (e.g., an electronic display screen that is part of the door or located near the door) can serve as part of a personalized advertisement system that identifies a customer (e.g., an existing customer) and displays personalized information associated with the customer. For example, images captured by the cameras can be used by an advertising system (of which the image processing system can be a part) to select advertisements appropriate to the customer standing in front of a display case door.

Panel assembly 20 includes one or more panes (not shown) of transparent or substantially transparent glass, plastics, or other transparent or substantially transparent materials. Panel assembly 20 can include multiple layers of transparent panes. For example, panel assembly 20 can be a multi-pane unit having two panes separated by a gap, forming a sealed glass unit (SGU). Panel assembly 20 can be a vacuum insulated glass (VIG) assembly. For example, a VIG assembly is an SGU in which the sealed space can be an evacuated space below atmospheric pressure.

Figure 2:
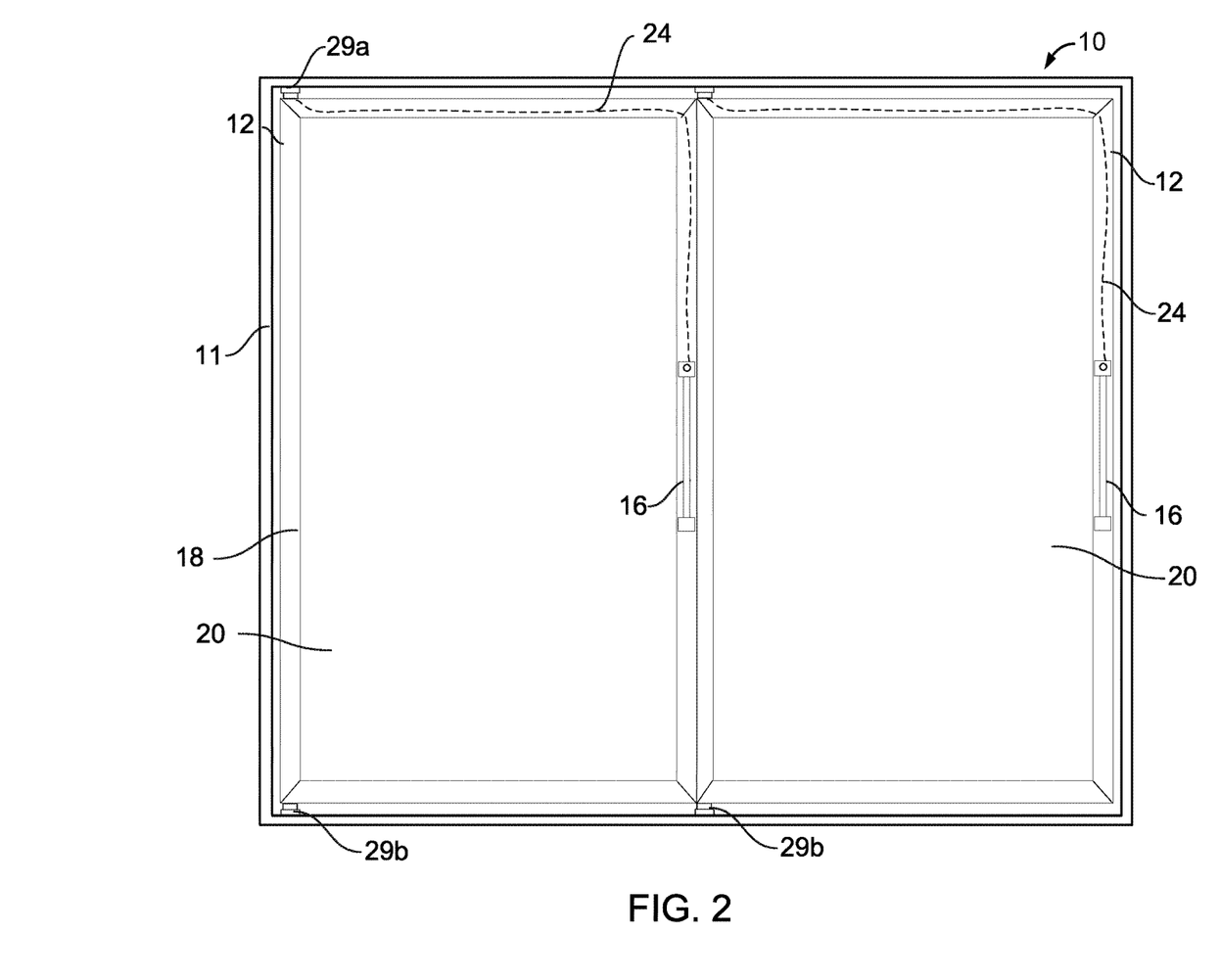
FIG. 2 is a front view of two exemplary display case doors mounted on a display case according to implementations of the present disclosure.

FIG. 2 illustrates an exemplary display case door assembly 10 installed in a refrigerated display case 11. Display case door assembly 10 includes two display case doors 12 pivotally mounted on display case 11 by door hinges 29. The refrigerated display case 11 may be a refrigerator, freezer, or other enclosure defining a temperature-controlled space. For example, refrigerated display case 11 may be a refrigerated display case or refrigerated merchandiser in grocery stores, supermarkets, convenience stores, florist shops, and/or other commercial settings to store and display temperature-sensitive consumer goods (e.g., food products and the like). Refrigerated display case 11 can be used to display products that must be stored at relatively low temperatures and can include shelves, glass doors, and/or glass walls to permit viewing of the products supported by the shelves. In some implementations, refrigerated display case 11 is a refrigerated display unit used, for example, in warehouses, restaurants, and lounges. For example, refrigerated display case 11 can be a free-standing unit or "built-in" unit that forms a part of the building in which the refrigerated display case 11 is located.

The door frame 13 of each display case door 12 includes a hinge 18 with top and bottom openings (not shown) that receive hinges 29 (e.g., pin hinges) for pivotally mounting doors 12 on display case 11. In some examples, the hinge 18 can be a knuckle hinge, a ball bearing hinge, or a hinge rail. For example, a hinge rail can be pivotally connected to a hinge 29a attached to the frame of case 100, where the hinge 29a is inserted into a top opening of the hinge rail. Top hinge 29a can be an electrical hinge from which one or more power cables 24, data cables, or power/data cables (e.g., USB cables) extend. For example, hinge 29a can include an aperture to permit the power and data cables (e.g., cables extending from an external power source) to pass through into the door frame channel. In some implementations, hinge 29a can include an electrical connector (not shown) from which each power cable 24 extends. In some examples, the electrical connector includes a 120V frame plug. In some implementations, hinge 29 can additionally include a separate data cable contact. In some implementations, bottom hinge 29b can be a gravity hinge and the top hinge 29a an electrical hinge.

In some examples, other electrical cables can extend from hinge 29a. For example, panel assembly 20 may include an anti-condensation system that requires power for heating the panel 20 (e.g., providing power to an electro-conductive coating), in which additional electrical conductors may provide such power. In some cases, instead of hinges 29, the display case door can be mounted to case 100 using any type of appropriate hinges such as knuckle hinges or ball bearing hinges. In some implementations, doors 12 can be sliding doors configured to open and close by sliding with respect to the case frame.

Figure 3:
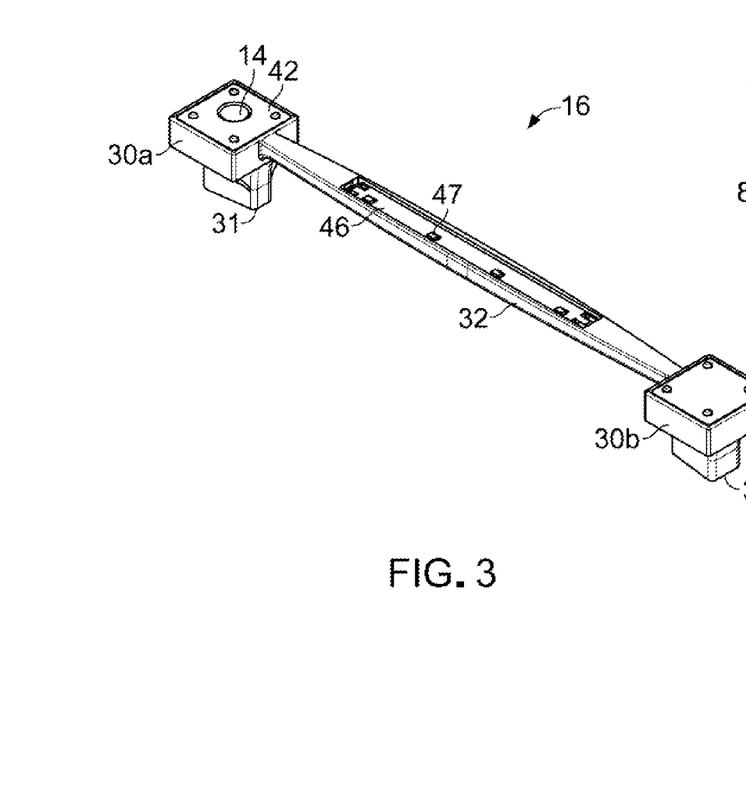
FIG. 3 is a perspective view of an exemplary door handle according to implementations of the present disclosure.
Figure 4:
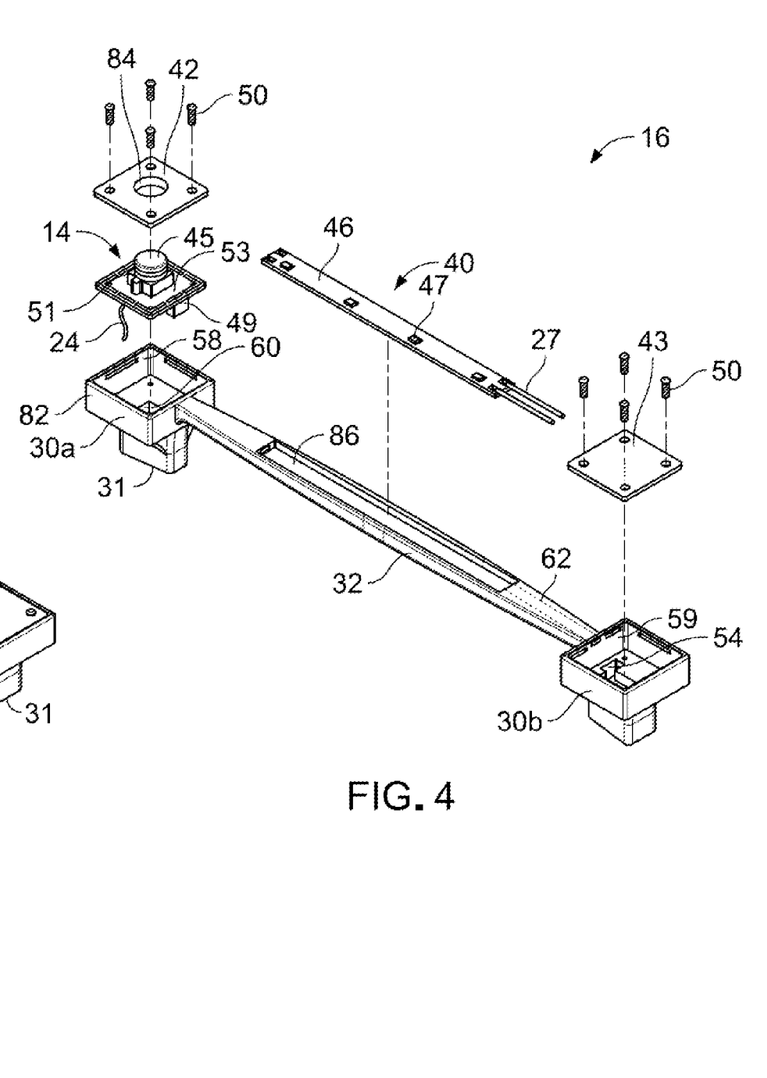
FIG. 4 is a perspective, exploded view of the door handle of FIG. 3.

FIGS. 3 and 4 illustrate a door handle 16 according to an exemplary implementation of the present disclosure. Door handle 16 includes two bases 30a and 30b that are configured to attach to the door frame 13 (see FIG. 2). As shown in FIG. 3, each base 30a and 30b has a coupling interface 31 that faces the door frame and is configured to attach the door handle to the door frame e.g., with mechanical fasteners or an adhesive. As shown in FIG. 4, each base 30a and 30b has a housing for storing devices, cables, circuitry, or other related components. For example, top base 30a (e.g., the base farther from the floor) has a housing 58 in which camera 14 can be stored and mounted such that lens 45 points away from the door toward customers. For example, housing 58 can be formed by machining a recess on the base 30a that extends from a surface opposite the panel assembly, leaving thin walls 82 that form the case of the housing. Alternatively, base 30a can be formed using a die casting process to mold the walls, channel, and shape of the base. In some implementations, housing 58 can be a square casing, a circular casing, or a rectangular casing, for example. Housing 58 is sized to snuggly fit a small camera 14 capable of performing facial recognition. Camera 14 can be a modular camera such as a compact, mono board camera that has its optical recording devices—lens 45 and image sensor 51—directly attached to a printed circuit board 53. Circuit board 53 can further include mounting members 49 that attach to the inside of housing 58 to secure the camera to the housing. Power cable 24 is connected to a back surface of camera 14 to provide power to the camera. Base 30a further includes a channel 60 that extends from the housing 58 to the coupling interface 31 of base 30a. Channel 60 receives power cable 24 that extends from camera 14 through channel 60, to a channel of the door frame, as further described in detail with respect to FIG. 5. Once camera 14 is disposed inside housing 58, a cover or lid 42 can be attached (e.g., with mechanical fasteners 50) to the walls 82 of housing 58 to cover a portion of the camera. Cover 42 has a hole or aperture 84 that is arranged to align with lens 45 when the cover is coupled to the housing 58, to allow lens 45 to perform facial recognition of customers standing in front or nearby the display case door.

The handle bases 30a and 30b and respective covers 42 and 43 allow camera 14 to be placed discretely on handle bar 32, which may improve the aesthetic appearance of door handle 16. Additionally, the covers 42 can be quickly removed to allow easy access to the cameras for maintenance or replacement, without the need to remove the entire door handle. In some implementations, door handle 16 can be installed in an existing display case door without retrofitting the door.

Referring back to FIG. 1, cameras 15 are attached to door frame 13. One or more of the cameras 15 can be an eye-level camera that is attached to the panel assembly or the door frame at a height near the eyes of a customer standing in front of the display case door. Similar to the handle camera 14, the eye-level camera 15 can be communicably coupled to an image processor processing system (not shown) configured to perform facial recognition as part of an advertisement system.

Still referring to FIG. 4, the bottom base 30b has a housing 59 and a channel 54 similar to the housing and channel of top base 30a. Housing 59 receives a power cable from an LED assembly 40 that is coupled to handle bar 32. The LED assembly includes multiple LED lights 47 attached to a printed circuit board 46. Circuit board 46 is a long, thin board that is arranged to fit in a groove or recess 86 of the handle bar 32. LED assembly 40 is mounted on handle bar 32 such that LED lights 47 face away from the panel assembly. Handle bar 32 further includes a conduit or inner channel 62 that extends from recess 86 to housing 59 of base 30b. Inner channel 62 receives power cables 24 from the LED assembly 40 to protect and hide the cables. Cables 27 extend from LED assembly 40 through inner channel 62 to channel 54, to a channel of the door frame. In some examples, a cover (not shown) can be attached to handle bar 32 to cover or partially cover parts of the LED assembly. In some implementations, housing 59 can house a second camera similar to camera 14.

Figure 5:
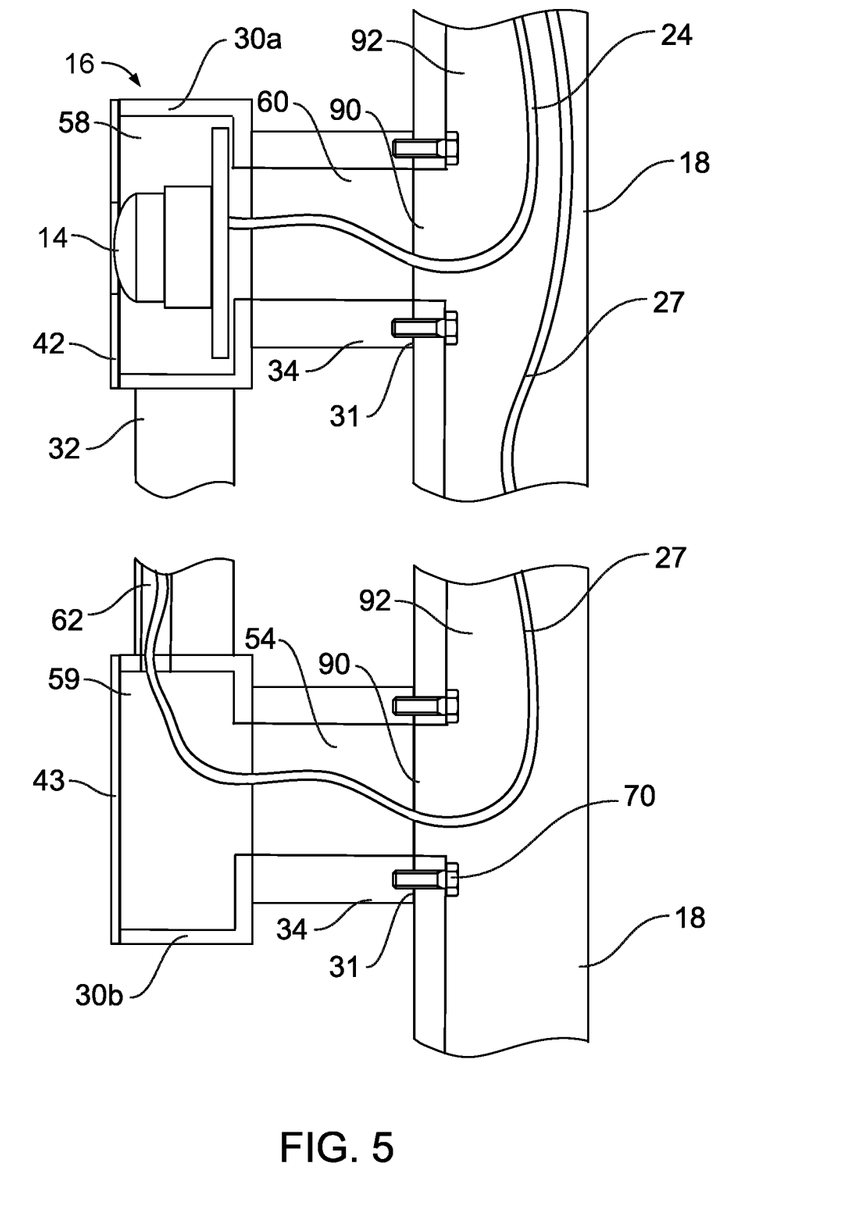
FIG. 5 is a side cross-sectional view of two portions of the door handle attached to a door frame of the display case door of FIG. 2.

FIG. 5 illustrates a side cross-sectional view of the top base 30a and the bottom base 30 attached to door frame 13. Each base has a leg 34 that connects the housing to the door frame 13. Each leg 34 has a coupling interface 31 that receives fasteners 70 extending from the door frame to secure door handle 16 to the door frame 13. The housing 58 and leg 34 of top base 30a together form an inner channel 60 that receives power cable 24. Channel 60 is aligned with a hole or aperture 90 of the door frame 13 that connects channel 60 to a door frame channel 92. Thus, power cable 24 extends from camera 14 through the base, to the door frame to connect to a power source (not shown).

Bottom base 30b also has an inner channel 54 that extends from housing 59 through leg 34 to a hole 90 of the door frame 13. Channel 54 receives power cable 27 that powers the LED lights (see FIG. 4) and allows cable 27 to extend to door frame channel 92. The channel 92 of the door frame 13 extends through an entire length of the door frame to allow the power cables 24 and 27 to extend to a power source, as described above with respect to FIG. 2.

While a number of examples have been described for illustration purposes, the foregoing description is not intended to limit the scope of the invention, which is defined by the scope of the appended claims. There are and will be other examples and modifications within the scope of the following claims.

What is claimed is:

1. A display case door comprising:
 a transparent panel assembly; and
 a door handle coupled to the transparent panel assembly and comprising a housing, the door handle comprising:
  a camera releasably coupled to and residing within the housing of the door handle, the housing comprising a cover covering a portion of the camera and releasably attached to the handle over the housing, the camera positioned such that a field of view of the camera is aimed away from the transparent panel assembly, wherein the camera comprises a lens and an image sensor attached to a printed circuit board of the camera, the camera configured to be exposed upon removing the cover, the printed circuit board releasably attached to the housing such that the camera is removable from the housing upon removing the cover and removing the printed circuit board from the housing to expose the camera and allow replacement or servicing of the camera without removing the door handle from the transparent panel assembly; and an aperture opposite the lens of the camera and configured to receive a power cable extending away from the camera to a power source.

2. The display case door of claim 1, further comprising a door frame extending about and secured to a peripheral edge of the transparent panel assembly, the door handle attached to the door frame.

3. The display case door of claim 2, further comprising one or more additional cameras coupled to the door frame, the one or more additional cameras positioned such that a field of view of the one or more additional cameras is aimed away from the transparent panel assembly.

4. The display case door of claim 2, wherein the door frame comprises a channel configured to receive the power cable extending away from the aperture of the door handle.

5. The display case door of claim 2, wherein the door handle comprises two handle bases coupled to the door frame and a bar extending between the two handle bases.

6. The display case door of claim 5, wherein the camera is coupled to a top base of the two handle bases.

7. The display case door of claim 5, wherein at least one of the two handle bases comprises the housing configured to receive the camera.

8. The display case door of claim 7, wherein the aperture comprises a channel extending from an interface surface of the one of the two handle bases to the housing, the channel configured to receive the power cable.

9. The display case door of claim 7, wherein the housing comprises a recess extending from a surface of the handle base opposite the transparent panel assembly.

10. The display case door of claim 9, wherein the cover is configured to couple to walls of the housing and cover a portion of the camera, the cover comprising an aperture arranged to align with the field of view of the camera when the cover is coupled to the door handle.

11. The display case door of claim 2, wherein the door frame comprises an aperture arranged to align with the field of view of a door frame camera attached to the door frame to allow the door frame camera to detect a person standing in front of the display case door.

12. The display case door of claim 2, wherein the housing comprises a recess or cavity integrally formed in the door handle.

13. The display case door of claim 1, wherein the camera is communicably coupled to a computing system configured to perform facial recognition.

14. The display case door of claim 1, wherein the field of view of the camera comprises the camera lens facing away from the transparent panel assembly, and the cover comprises an aperture aligned with the lens of the camera.

15. The display case door of claim 1, further comprising an LED light coupled to a bar of the door handle, the LED light facing away from the transparent panel assembly.

16. The display case door of claim 15, wherein the bar of the door handle comprises a recess configured to receive the LED light; and an inner channel extending from the recess to a handle base and configured to receive a cable from the LED light.

17. The display case door of claim 1, wherein the printed circuit board comprises mounting members releasably attached to an internal surface of the housing and securing the camera to the housing.

18. The display case door of claim 17, wherein the housing comprises walls arranged to correspond with a peripheral edge of the printed circuit board.

19. The display case door of claim 18, wherein the cover is sized to correspond with the walls of the housing to attach to an upper edge of the walls.

20. The display case door of claim 18, wherein the camera comprises a modular, mono board camera.

21. A display case door comprising:
a transparent panel;
a door frame extending about and secured to a peripheral edge of the transparent panel; and
a door handle coupled to the door frame and comprising a housing, the door handle comprising:
a camera releasably coupled to and residing within the housing of the door handle, the housing comprising a cover covering a portion of the camera and releasably attached to the handle over the housing, the camera positioned such that a field of view of the camera is aimed away from the transparent panel, wherein the camera comprises a lens and an image sensor attached to a printed circuit board of the camera, and the printed circuit board is releasably attached to the housing such that the camera is removable from the housing upon removing the cover and removing the printed circuit board from the housing to expose the camera and allow replacement or servicing of the camera without removing the door handle from the transparent panel; and
an aperture opposite the lens of the camera and configured to receive a power cable extending away from the camera into a channel of the door frame to a power source.

22. A display case door comprising:
a transparent panel;
a door frame extending about and secured to a peripheral edge of the transparent panel;
a power cable disposed within a channel in a portion of the door frame; and
a door handle coupled to the door frame and comprising a housing integrally formed with the door handle, the door handle comprising:
two handle bases coupled to the door frame and a bar extending between the two handle bases, at least one of the two handle bases defining the housing,
a camera releasably coupled to and disposed within the housing, the camera positioned such that a field of view of the camera is aimed away from the transparent panel, the housing comprising a cover covering a portion of the camera and releasably attached to one of the two handle bases over the housing, the camera comprising a lens and an image sensor attached to a printed circuit board of the camera, the printed circuit board releasably attached to the housing such that the camera is removable from the housing upon removing the cover and removing the printed circuit board from the housing to expose the camera and allow replacement or servicing of the camera without removing the door handle from the transparent panel; and an aperture opposite the lens of the camera and configured to receive the power cable, the power cable configured to electrically connect the camera to a power source;
wherein the camera is communicably coupled to a computing system configured to perform facial recognition.

23. The display case door of claim 22, further comprising one or more additional cameras coupled to the door frame, the one or more additional cameras positioned such that a field of view of the one or more additional cameras is aimed away from the transparent panel.

24. The display case door of claim 22, wherein the cover is configured to couple to walls of the housing to cover a portion of the camera, the cover comprising an aperture arranged to align with the field of view of the camera when the cover is coupled to the door handle.

25. The display case door of claim 22, further comprising an LED light coupled to a bar of the door handle, the LED light facing away from the transparent panel.

26. The display case door of claim 25, wherein the bar of the door handle comprises a recess configured to receive the LED light; and an inner channel extending from the recess to a handle base and configured to receive a cable from the LED light.

* * * * *